Feb. 6, 1973  D. I. DENNY  3,715,132
LOAD SUPPORTING CARRIAGE STRUCTURE FOR TRAILERS
Filed Feb. 24, 1971  2 Sheets-Sheet 1

INVENTOR.
Donald I. Denny
BY Williamson, Palmatier
& Bains ATTORNEYS

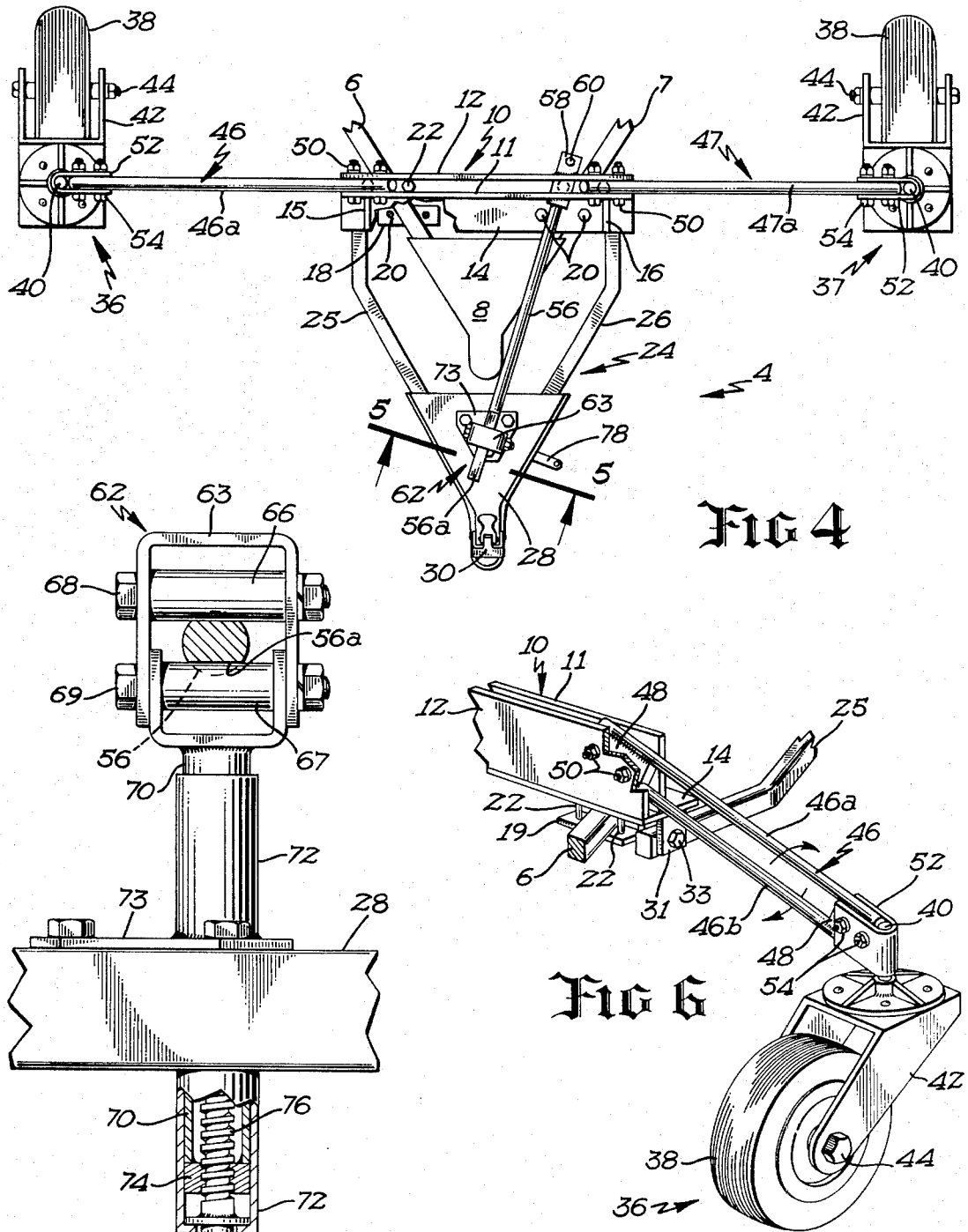

United States Patent Office
3,715,132
Patented Feb. 6, 1973

3,715,132
LOAD SUPPORTING CARRIAGE STRUCTURE
FOR TRAILERS
Donald I. Denny, 2626 Loomis St.,
La Crosse, Wis.
Filed Feb. 24, 1971, Ser. No. 118,328
Int. Cl. B62d 53/04
U.S. Cl. 280—405 R
10 Claims

ABSTRACT OF THE DISCLOSURE

A wheeled carriage assembly for supporting the front end of trailer including a mounting beam assembly which is rigidly attached to the front end of a trailer, a draw bar assembly pivotally connected to the mounting beam for pivotal movement about a horizontal axis, and a pair of torsion bar units rigidly connected to the mounting beam assembly and extending laterally outwardly on opposite sides thereof, each of the torsion bar units being connected at its outer end to a caster wheel at a location offset from the center of the wheel. An elongated spring bar rigidly attached at one end to the aforesaid beam assembly and having its forward end engaged by a coupling on the front of the pivotal draw bar assembly limits relative vertical movement between the front end of the trailer and the rear end of a towing vehicle.

BRIEF SUMMARY OF THE INVENTION

This invention is directed to a wheeled carriage assembly or support dolly for supporting the front end of relatively large trailers, such as house trailers and campers of the type conventionally towed by ordinary passenger cars. Trailers of this type which have only one set of wheels, or a tandem set of wheels, towards the rear end of the trailer rely for support of their front ends on the tow vehicle to which they are coupled by a trailer hitch. This necessarily imposes an extraordinary weight load on the rear end of the tow car, often resulting in undue wear and damage to the springs and shock absorbers of the tow car.

I have overcome this problem in an effective and relatively simply way by providing a two wheeled support carriage or dolly which is rigidly secured to the front end of a trailer, and which is particularly characterized by a pair of torsion bar units that cooperate with the carriage wheels to provide a weight suspension system for the front end of the trailer. The wheels of the support carriage advantageously take the form of caster wheels which are pivotally supported for 360° rotation about vertically disposed spindles. This wheel arrangement greatly improves the steering control of the trailer when backing up with a tow car.

In a preferred form of my invention, I utilize a rigid, horizontal beam member oriented transversely with respect to the trailer's chassis to provide a convenient means for attaching the carriage assembly to frame structure at the forward end of trailer, the beam member also serving to support a pair of torsion bar units extending laterally outwardly to carriage wheels on each side of the beam structure. Each of the torsion bar units is rigidly secured at its inner end to the beam structure and has its outer end connected to one of the carriage wheels at a location offset from the center of the wheel along a line generally parallel to the direction of trailer travel.

A further beneficial aspect of my trailer support carriage resides in the pivotal mounting of a draw bar assembly on the aforesaid beam member, the draw bar being supported for pivotal movement about a horizontal axis and having a trailer hitch coupling at its forward end. An elongated spring bar fixed at its inner end to a portion of the trailer frame structure, as by attachment to the aforesaid beam member, and engaged at its outer end in a coupling assembly connected to the front of the pivotal draw bar serves to dampen the bouncing or vertical articulation of the front end of the trailer relative to the rear end of the tow vehicle.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 4 is a top, plan view of the dolly mounted on the front end of a trailer as in FIG. 1;
FIG. 5 is a fragmentary, section view of a portion of the dolly structure taken along lines 5—5 of FIG. 4;
and
FIG. 6 is a fragmentary, perspective view showing one of the torsion bar units and wheel assemblies of the load support dolly.

DESCRIPTION OF THE PREFERRED EMBODIMENT

The load support dolly of this invention has been designed with a view towards providing adequate support for the front end of a large, heavy trailer to relieve the load normally imposed on the rear end of a tow car, as well as to limit the relative vertical bouncing movement of the front end of the trailer and the rear end of the tow vehicle relative to each other and provide a shock absorbing effect. I anticipate that my unique support dolly unit may be installed on the front end of trailers as a wheeled carriage assembly forming a part of the original trailer equipment supplied by the manufacturer, as well as being built as a separate dolly unit for field installation on existing trailers. The latter type of installation and application is illustrated and described herein.

Figure 1:
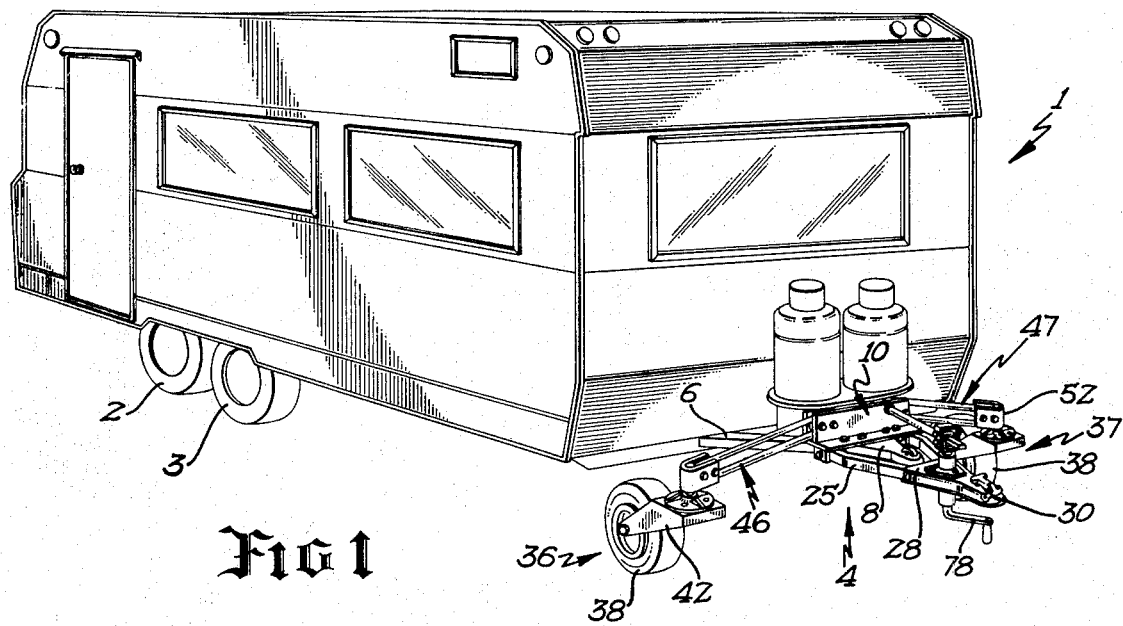
FIG. 1 is a perspective view of a trailer showing my support dolly mounted on the front end thereof.
Figure 2:
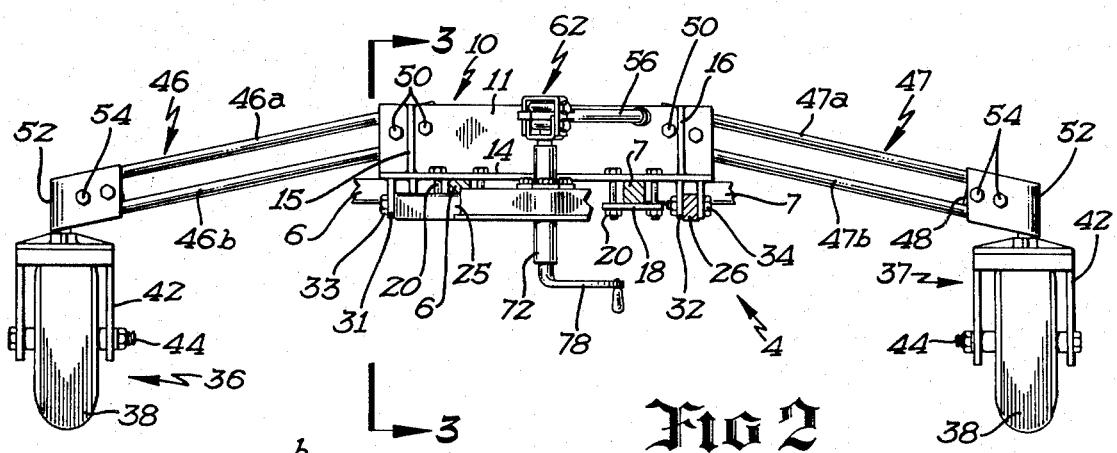
FIG. 2 is a front view of the dolly and a portion of the front frame structure of the trailer of FIG. 1.

Referring now to the drawings, I have shown in FIG. 1 a large house trailer 1 of the general type to which I feel my support dolly structure has particular application. Trailer 1 has a pair of tandem wheels 2, 3 located towards the rear end thereof, and is shown with the support dolly of this invention mounted on the front end thereof, the dolly structure being generally indicated by reference numeral 4. As may be noted most clearly by reference to FIGS. 1 and 4, trailer 1 has a rigid towing tongue unit mounted on its front end and comprising a pair of opposed, side frame members 6 and 7 joined in a generally V-shaped configuration by a connecting brace 8 at the forward end thereof. Such a pulling or towing tongue is conventionally supplied at the front end of trailers, and is normally rigidly secured to a portion of the trailer frame at the front ends thereof, thereby forming a part of the frame structure of the trailer. For field installation purposes, I have found it particularly convenient to use side frame members or arms 6 and 7 of the trailer towing tongue as means for mounting the wheeled carriage or support dolly 4 on the front end of the trailer. To this end, dolly 4 has as a basic structural component a beam member 10 which is oriented transversely of the longitudinal axis of trailer 1 and which is utilized to attach dolly 4 to side frame members 6 and 7 of the trailer towing tongue. As may best be understood by reference to FIGS. 2, 3, 4 and 6, cross beam 10 is of generally channel shaped configuration and is comprised of two, spaced apart upright plates 11 and 12 joined together at their bottom ends by a horizontally extending plate 14. A pair of upright gusset plates 15 and 16 welded to plates 11 and 14 lend rigidity and support to the beam structure, thereby providing a strong mounting assembly for support carriage or dolly 4. Each of the frame arms 6 and 7 of the towing tongue for trailer 1 is rigidly attached to transverse beam structure 10 by a pair of spaced apart bracket plates 18 and 19 which bear against the underside of arms 6 and 7 and are bolted to cross beam 10. Forwardly disposed bracket plates 18 are secured to cross plate member 14 of beam 10 by a first pair of bolts 20; and bracket plates 19, which are located more rearwardly along the length of arms 6 and 7 are secured to beam plate 14 by a second pair of bolts 22, these bolts engaging plate 14 between upright plate members 11 and 12 as shown in FIGS. 2 and 4.

Support dolly or wheeled carriage 4 further includes a forwardly extending draw bar assembly generally indicated by reference numeral 24 and comprised of a pair of side arm frame members 25 and 26 joined together at their forward ends in a V-shaped assembly by means of triangular shaped connecting members 28. Connecting member 28 includes a coupling 20 at its forward end of conventional design adapted to releasably engage a ball hitch on the rear end of a towing car. Draw bar assembly 24 extends in a direction generally normal to beam 10 with arms 25 and 26 of the draw bar assembly 24 being pivotally connected to beam 10 by means of bifurcated bracket joints 31 and 32 depending from the underside of bottom plate 14 of beam 10. Pivot bolts 33 and 34 serve to hold draw bar arms 25 and 26 in place and define a horizontal axis about which draw bar assembly 24 may be pivoted upward and downwardly. This provision for pivotal movement of draw bar assembly 24 in a vertical direction provides for a degree of articulating, vertical movement between the forward end of trailer 1 and the rear end of a tow vehicle to which draw bar assembly 24 is coupled. The extent of pivotal movement of draw bar assembly 24 is limited in a manner hereinafter explained in order to restrain the up and down bouncing movement of the forward end of trailer 1 and the rear end of a tow vehicle relative to each other.

Figure 3:
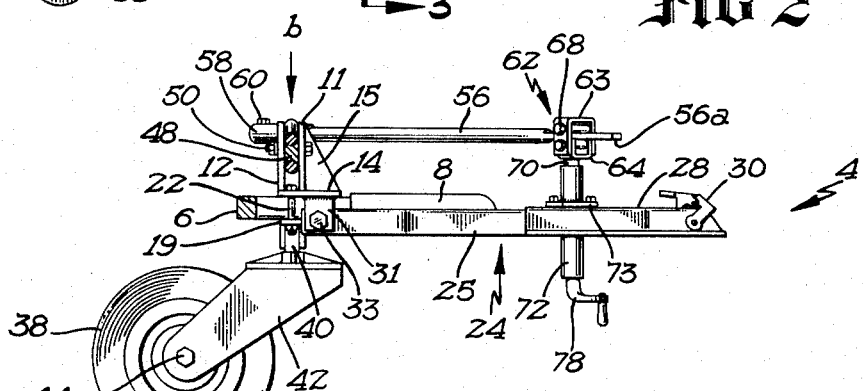
FIG. 3 is a side elevation view of the dolly of FIG. 2, partially in section, and taken along lines 3—3 of FIG. 2.

Dolly 4 is supported on the ground by a pair of wheel assemblies 36 and 37, each of which includes a ground engaging wheel 38. Each of the wheels 38 is preferably a caster wheel pivotally supported on an upright spindle 40 for full 360° rotation by means of a connecting, bifurcated bracket unit 42 which carries a pivot bolt 44 about which each wheel 38 rotates. The provision of caster wheels on support dolly 4 greatly improves the steering control of trailer 1 when backing up the trailer with a tow vehicle. Wheel assemblies 36 and 37 are supported on opposite sides of beam 10 of dolly 4 by means of a pair of laterally extending torsion bar units 46 and 47. These torsion bar units extend in a direction generally transverse to the longitudinal axis of dolly 4 and trailer 1 or the direction of dolly travel. Each of the torsion bar units 46, 47 is comprised of a pair of torsion bars 46a, 46b and 47a, 47b disposed one over the other in a common vertical plane. This double torsion bar assembly for each of the units 46, 47 provides added strength and support to sustain the weight load of the front end of trailer 1, and also provides an increased torsion effect to absorb the shocks generated by the travel of wheel assemblies 36 and 37 over rough or uneven terrain. It is of course possible that each of the torsion bar units 46 and 47 could be comprised of only a single, elongated torsion bar of predetermined cross-sectional area to handle the anticipated weight load of the front end of a trailer. Since the torsion bar units 46, 47 are of identical construction, the construction and mounting arrangement of these torsion bar units will be described only with respect to unit 46. Elongated torsion bars 46a and 46b are rigidly joined together at their opposite ends by a plate or plug 48 welded therebetween. Weld plate 48, forming a unitary weldment at each end of torsion bars 46a and 46b is shown in FIGS. 3 and 6. These end weldments utilizing plate or plug 48 serve as a means for affixing the opposite ends of torsion bars units 46 and 47 to beam 10 and wheel assemblies 36, 37 respectively. At their inner ends, each of the torsion bar units 46, 47 is received between upright plates 11 and 12 of transverse beam 10 and is rigidly secured thereto by means of bolts 50 extending through plates 11, 12 and weld plate 48. At their outer ends, each of the torsion bar units 46, 47 is affixed to a U-shaped bracket 52 by means of bolts 54 extending therethrough and through weld plate 48. Each of the wheel spindles 40 is received within the outer end of U-shaped brackets 52 and is rigidly attached thereto, as by welding, wheel mounting brackets 42 being mounted for pivotal movement on the lower end of spindles 40. Rather than providing double torsion bars 46a, 46b and 47a, 47b welded together at their ends, I contemplate that manufacturing could be simplified by forming each torsion bar unit from a unitary piece of metal slotted along its length to provide a double torsion bar assembly.

It is important to note that torsion bar units 46 and 47 are connected at their outer ends to wheel assemblies 36, 37 at a location defined by upright spindles 40 which is offset from the center of each wheel 38, defined by axle bolts 44, along the direction of dolly and trailer travel. This direction will normally be along a line substantially perpendicular to torsion bar units 46 and 47 as viewed in FIG. 4. It will be appreciated that this particular offset mounting of the torsion bar units relative to the center of wheels 38 provides a moment arm extending between wheel axle bolt 44 and torsion bar units 46, 47 in a direction perpendicular thereto, thus imparting twisting or torsion stress to the outer end of torsion bar units 46 and 47 about their fixed inner connections to beam 10. The reaction force generated upwardly through the center of wheel 38 as it traverses rough terrain under the weight load of trailer 1 and the downward force generated by the weight load of the trailer acting on torsion bar units 46 and 47, as indicated by the directional force arrows a and b respectively in FIG. 3, imparts a twisting stress to the torsion bar units in the direction indicated by the rotational arrows in FIG. 6. There will be a tendency for double torsion bars 46a, 46b and 47a, 47b to twist around each other in a spiral configuration under impact load of the wheel assemblies on the ground, thereby providing a particularly effective torsion bar effect. The advantageous result of this torsion bar suspension assembly for the front end of trailer 1 is a relatively smooth, non-bouncing ride for the front end of trailer 1 as torsion bar units 46 and 47 absorb the shock caused by the travel of wheels 38 over rough terrain. It can thus be seen that the weight load and shock impacts normally transmitted to the rear end of a tow vehicle from the front end of trailer 1 through the ordinary towing tongue connection will be substantially carried and absorbed by support dolly 4.

In order to further dampen the bouncing or vertical displacement of the front end of trailer 1 as it traverses rough terrain, relative to the rear end of the tow vehicle, which is a common problem in towing trailers of the type shown in FIG. 1, I provide an additional, elongated spring bar 56 which extends forwardly from beam structure 10 to a point of connection with the front end of draw bar assembly 24. Bar 56 is rigidly secured at its inner end to beam 10 by means of a sleeve 58 within which bar 56 is received, sleeve 58 being welded to plates 11 and 12 of beam 10. Bar 56 is held in place within sleeve 58 by means of a retention bolt or pin 60. At its forward end, spring bar 56 is restrainably engaged by a coupling assembly 62. Preferably, for reasons hereinafter explained, coupling assembly 62 takes the form of a roller unit comprised of upper and lower U-shaped members 63 and 64 which rotatably support a pair of rollers 66 and 67 by means of pivot bolts 68, 69 extending therethrough. Pivot bolts 68 and 69 define horizontal axes about which rollers 66 and 67 are free to rotate. As appears most clearly in FIGS. 3 and 5, the forward end 56a of bar 56 is flattened to provide good, rolling contact with rollers 66 and 67 between which flattened end 56a is tightly received. Lower, U-shaped member 64 has a downwardly depending mounting arm 70 connected thereto, arm 70 being received within an upright, tubular guide housing 72 affixed to the forward end of draw bar assembly 24 by a bracket plate 73 to which tubular housing 72 is welded. As appears most clearly in FIGS. 3, 4 and 5, mounting plate 73 is bolted to connecting brace 28 at the forward end of draw bar assembly 24. Mounting arm 70 and tubular housing 72 form a part of a lift or jack for coupling assembly 62, which also includes a nut 74 welded to the lower end of lift arm 70 and threadedly engaging a lift screw 76 extending vertically within housing 72. Lift screw 76 is rotatably supported at its opposite ends in tubular housing 72 and is attached to a crank arm 78. Crank arm 78 can be rotated in a clockwise or counterclockwise direction to raise or lower lift arm 70, and thus coupling assembly 62 therewith. Nut 74 on arm 70 will ride up and down on lift screw 76 as it is rotated.

The inner or rear end of spring bar 56 will tend to move up and down with the front end of trailer 1, by virtue of its attachment to cross beam 10 which is rigidly connected to the towing tongue frame structure at the forward end of trailer 1. Spring bar 56 is sufficiently elastic as to sustain a limited degree of bending without permanent deformation. It will be appreciated that as the front end of trailer 1 tends to rise or fall as it traverses rough terrain, it will try to carry pivotal draw bar assembly 24 with it by virtue of the connection of the forward end of bar 56 to the front end of drawbar assembly 24 through coupling assembly 62. Thus, the extent of pivotal coaction between draw bar assembly 24 and the frame structure at the forward end of trailer 1 will be limited by the extent to which the forward end of spring bar 56 can be deflected to bend bar 56 as the forward end of draw bar assembly 24 pivots up and down. As coupling assembly moves up and down through a limited path of vertical movement with the forward end of draw bar assembly 24, rollers 66 and 67, being in tight, frictional engagement with the front end of spring bar 56 will tend to bend bar 56 upwardly or downwardly as they roll back and forth on flattened end 56a thereof. Thus, the limited degree of bending imparted to spring bar 56 in a vertical plane will tend to limit vertical, articulating movement between the front end of trailer 1 and the rear end of a tow vehicle, thereby providing a shock absorbing effect as the front end of bar 56 is deflected upwardly and downwardly. Spring bar 56 has a further beneficial effect, in that it serves to transmit a portion of the weight of the rear end of the towing vehicle to dolly support wheels 38. In effect, spring bar 56, being rigidly secured between the front end of trailer 1 and the forward, trailer hitch coupling 30 which is coupled to the hitch on the rear end of a towing vehicle, will cause the front end of trailer 1 to try to carry the rear end of the tow vehicle with it as it bounces upwardly and downwardly to a limited extent, thereby transmitting a portion of the weight of the rear end of the tow vehicle to dolly wheels 38. The spring action of bar 56, and the extent to which it transmits weight from the rear end of the tow vehicle to the dolly wheels can be adjusted and predetermined by utilizing crank handle 78 to raise or lower coupling assembly 62. By turning crank handle 78 in a direction to lift mounting arm 70 of coupling assembly 62, relative to the forward end of draw bar assembly 24, the forward end of bar 56 will be deflected upwardly to impart a predetermined amount of bending stress to bar 56 with the result that a greater portion of the weight load on the rear end of the tow vehicle will be transmitted to dolly wheels 38. This type of adjustment is particularly useful if a large load is being carried in the trunk or rear end of the tow vehicle.

When making a field installation of the support dolly 4 as illustrated herein on the front end of a trailer, the dolly unit is simply rolled up into position adjacent the front end of a trailer 1, with beam 10 resting upon side frame members 6 and 7 of the trailer towing tongue. Bracket plates 18 and 19 are then installed in engagement with the bottom side of side frame members 6 and 7 of the trailer towing tongue, utilizing bolts 20 and 22 to secure the trailer towing tongue to cross beam 10. Side frame members 6 and 7 of the trailer towing tongue are received between side arms 25 and 26 of the dolly draw bar assembly 24 in the manner shown in FIG. 4. I of course anticipate that cross beam 10, or a modified beam structure may be utilized by manufacturers to mount support dolly 4 on the front end of a trailer as original factory equipment. In such a case, the standard, rigid towing tongue at the front end of a trailer defined by side frame members 6 and 7 and connecting brace 8 would not be used and draw bar assembly 24 would be utilized as the towing tongue for the trailer. Beam 10 would simply be rigidly secured under the forward end of the trailer by attachment to a portion of the chassis frame structure of the trailer.

I anticipate that various modifications may be made in the size, shape and arrangement of the various components of my support dolly structure as shown and described herein without departing from the spirit and scope of my invention as defined by the following claims.

I claim:

1. A load suspension dolly for trailers comprising:
   a generally horizontally extending, wheel supporting beam structure;
   a draw bar assembly connected to said beam structure and extending therefrom in a direction substantially normal thereto, said draw bar assembly having a coupling member at its end remote from said beam structure for removable attachment to a trailer hitch on a towing vehicle;
   a torsion bar unit extending laterally outwardly from said beam structure on each side thereof in a direction generally transverse to the direction of dolly travel;
   a pair of ground engaging wheel assemblies supported on opposite sides of said beam structure, each of said wheel assemblies having a castor wheel pivotally supported on a vertically extending spindle for rotation through a full 360° arc, said spindles being received within bracket means directly affixed to the outer ends of said torsion bar units, whereby said torsion bar units extend between the outer ends of said beam structure and said bracket means in a direction coextensive with the direction of extent of said beam structure; and
   means on said beam structure for attachment to the front end of a wheeled trailer.

2. In combination with a trailer having at least one set of ground engaging wheels thereon, a load supporting suspension and carriage assembly at the forward end of said trailer comprising:
   a rigid mounting assembly extending generally transversely of the longitudinal axis of said trailer and rigidly secured to frame structure at the forward end of said trailer;
   a draw bar assembly pivotally connected to said mounting assembly for pivotal movement about a horizontal axis and extending forwardly therefrom, said draw bar assembly having a coupling member at its forward end for detachable connection to a trailer hitch on a towing vehicle;
   a pair of ground engaging wheel assemblies supported on opposite sides of said mounting assembly, each of said wheel assemblies including a ground engaging caster wheel pivotally mounted on a vertical spindle for rotational movement through a full 360° arc;

a torsion bar assembly extending laterally outwardly from said mounting assembly on each side thereof in a direction generally normal to the longitudinal axis of said trailer, each of said torsion bar assemblies being rigidly secured at its inner end to said mounting assembly and having its outer end connected to one of said wheel assemblies at a location offset from the center of one of said wheels along a line extending generally parallel to the direction of travel of said trailer; and an elongated spring bar fixedly attached at its rear end to a portion of said frame structure at the forward end of said trailer and having its forward end engaged by a coupling assembly attached to the forward end of said pivotal draw bar assembly in such a way that said forward end of said draw bar assembly cannot pivot up or down without deflecting said forward end of said spring bar and bending said bar about said fixed rear end thereof, said spring bar being sufficiently elastic as to sustain a limited degree of bending without permanent deformation, whereby the relative pivotal movement of said forward frame structure of said trailer and said draw bar assembly with respect to each other is limited by the extend to which said forward end of said spring bar can be deflected and said bar bent.

3. A load suspension dolly for trailers comprising:

a generally horizontally extending, wheel supporting beam structure;

a draw bar assembly connected to said beam structure and extending therefrom in a direction substantially normal thereto, said draw bar assembly having a coupling member at its end remote from said beam structure for removable attachment to a trailer hitch on a towing vehicle;

a pair of ground engaging wheel assemblies supported on opposite sides of said beam structure;

a torsion bar unit extending laterally outwardly from said beam structure on each side thereof in a direction generally transverse to the direction of dolly travel, each of said torsion bar units being connected at its outer end to one of said wheel assemblies at a location offset from the center of the wheel of one of said wheel assemblies along the direction of travel of said dolly; and each of said torsion bar units comprising a pair of torsion bars disposed one above the other in a common vertical plane and rigidly secured at their inner ends to said beam structure, whereby the moment arm provided by the offset connection of said torsion bar units to said wheels will tend to cause said pair of torsion bars of each torsion bar unit to twist around each other as said wheels traverse rough terrain under the weight load of the front end of a trailer supported thereon; and means on said beam structure for attachment to the front end of a wheeled trailer.

4. A load suspension dolly for trailers comprising:

a generally horizontally extending, wheel supporting beam structure;

a draw bar assembly connected to said beam structure and extending therefrom in a direction substantially normal thereto, said draw bar assembly having a coupling member at its end remote from said beam structure for removable attachment to a trailer hitch on a towing vehicle;

a pair of ground engaging wheel assemblies supported on opposite sides of said beam structure;

a torsion bar unit extending laterally outwardly from said beam structure on each side thereof in a direction generally transverse to the direction of dolly travel, each of said torsion bar units being connected at its outer end to one of said wheel assemblies at a location offset from the center of the wheel of one of said wheel assemblies along the direction of travel of said dolly; and means on said beam structure for attachment to the front end of a wheeled trailer; and an elongated spring bar having a fixed, rear end rigidly attached to said beam structure and having its forward end engaged by a coupling assembly attached to the forward end of said pivotal draw bar assembly in such a way that said forward end of said draw bar assembly can not pivot upwardly or downwardly without deflecting said forward end of said bar and bending said bar about said fixed, rear end, said spring bar being sufficiently elastic as to sustain a limited degree of bending without permanent deformation, whereby the relative pivotal movement of said beam structure and said draw bar assembly with respect to each other is limited by the extent to which said forward end of said spring bar can be deflected in bending said bar.

5. A load suspension dolly as defined in claim 4 wherein:

said coupling assembly comprises a pair of spaced apart rollers between which the forward end of said spring bar is tightly received in frictional contact therewith, whereby said coupling assembly may roll back and forth on said forward end of said spring bar as said draw bar assembly pivots up and down with resulting deflection of said forward end of said spring bar and bending of said bar about said fixed end thereof.

6. A load suspension dolly as defined in claim 4 wherein:

said coupling assembly is vertically adjustable with respect to the forward end of said draw bar assembly, whereby said coupling assembly may be raised or lowered to thereby deflect said forward end of said spring bar and impart a predetermined bending stress to said spring bar.

7. A load supporting tow carriage on a trailer comprising:

a draw bar assembly pivotally connected to the front end of said trailer for pivotal movement about a horizontal axis, said draw bar assembly having a coupling at its forward end for detachable connection to a trailer hitch on a tow vehicle;

an elongated spring bar having a fixed connection at its rear end to frame structure rigidly secured to the front end of said trailer, and having its forward end restrainably engaged in a coupling assembly connected to the forward end of said draw bar assembly for vertical movement therewith, said spring bar being sufficiently elastic to sustain a limited degree of bending without permanent deformation, whereby vertical, articulating movement between the front end of said trailer and the rear end of a tow vehicle is limited and dampened without undue shock by the deflection of the forward end of said spring bar and the bending of said bar as the forward end of said draw bar assembly pivots up and down; and a pair of ground engaging wheels supported on opposite sides of said trailer at the forward end thereof by a pair of laterally extending support units extending in a direction substantially normal to said draw bar assembly.

8. A load supporting carriage as defined in claim 7 wherein:

said coupling assembly comprises a pair of vertically spaced rollers rotatably supported on horizontal axes in frictional engagement with the forward end of said spring bar received therebetween, whereby said coupling assembly can roll back and forth on said forward end of said spring bar as it moves vertically with the up and down pivotal movement of the forward end of said draw bar assembly and imparts bending deflection to said spring bar.

9. A load supporting carriage as defined in claim 8 wherein:

said coupling assembly is attached to the forward end of said draw bar assembly by a vertically adjustable lift mechanism permitting said coupling assembly to be raised or lowered with respect to said forward end of said draw bar assembly to thereby impart a predetermined bending stress to said spring bar.

10. A load supporting carriage as defined in claim 7 wherein:

said laterally extending support units for said wheels are in the form of a pair of torsion bar assemblies extending laterally outwardly from either side of said frame structure and rigidly secured thereto at their inner ends, said torsion bar assemblies being connected at their outer ends to said wheels at locations offset from the center of said wheels along the direction of travel of said trailer.

References Cited

UNITED STATES PATENTS

| | | | |
|---|---|---|---|
| 2,779,602 | 1/1957 | Kimbro et al. | 267—57 X |
| 2,977,132 | 3/1961 | Bainbridge | 267—57 X |
| 2,493,405 | 1/1950 | Hedgpeth | 280—405 R |
| 2,404,121 | 7/1946 | Black | 267—57 X |
| 2,884,240 | 4/1959 | Loughlin | 267—57 X |

FOREIGN PATENTS

| | | | |
|---|---|---|---|
| 256,268 | 10/1964 | Australia | 280—476 R |

LEO FRIAGLIA, Primary Examiner

U.S. Cl. X.R.

280—476 R; 267—57